(12) United States Patent
Keates (10) Patent No.: US 11,127,999 B2
(45) Date of Patent: Sep. 21, 2021

(54) PACKAGE-LESS BATTERY CELL APPARATUS, AND METHOD FOR FORMING THE SAME

(71) Applicant: INTEL CORPORATION, Santa Clara, CA (US)

(72) Inventor: Andrew W. Keates, Los Gatos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1033 days.

(21) Appl. No.: 15/071,118

(22) Filed: Mar. 15, 2016

(65) Prior Publication Data
US 2017/0271626 A1 Sep. 21, 2017

(51) Int. Cl.
| H01M 50/10 | (2021.01) |
| H01M 4/04 | (2006.01) |
| H01M 10/0562 | (2010.01) |
| H01M 50/116 | (2021.01) |
| H01M 50/183 | (2021.01) |
| H01M 50/531 | (2021.01) |
| H01M 50/543 | (2021.01) |
| H01M 10/0525 | (2010.01) |
| H01M 10/0585 | (2010.01) |
| H01M 10/052 | (2010.01) |

(52) U.S. Cl.
CPC ......... *H01M 50/10* (2021.01); *H01M 4/0407* (2013.01); *H01M 10/0525* (2013.01); *H01M 10/0562* (2013.01); *H01M 10/0585* (2013.01); *H01M 50/116* (2021.01); *H01M 50/183* (2021.01); *H01M 50/531* (2021.01); *H01M 50/543* (2021.01); *H01M 10/052* (2013.01); *H01M 2220/30* (2013.01)

(58) Field of Classification Search
CPC ........ H01M 2/0202; H01M 2/26; H01M 2/30; H01M 10/0525; H01M 10/0585; H01M 50/10; H01M 50/531; H01M 50/116; H01M 50/543; H01M 50/183; H01M 4/0407; H01M 10/0562; H01M 10/052
See application file for complete search history.

(56) References Cited

U.S. PATENT DOCUMENTS

| 5,567,544 A | 10/1996 | Lyman |
| 6,030,721 A * | 2/2000 | Lake ................... H01M 2/0215 |
| | | 429/124 |

(Continued)

FOREIGN PATENT DOCUMENTS

CN 104396043 3/2015

OTHER PUBLICATIONS

International Search Report and Written Opinion for International Patent No. PCT/US2017/016271, dated May 12, 2017.

(Continued)

*Primary Examiner* — Jimmy Vo
(74) *Attorney, Agent, or Firm* — Schwabe, Williamson & Wyatt, P.C.

(57) ABSTRACT

Described is an apparatus which comprises: a cathode current collector configured to be in direct contact to a first client terminal; an anode current collector configured to be in direct contact to a second client terminal; and at least two layers of active material, where one layer is adjacent to the cathode current collector and another layer is adjacent to the anode current collector.

18 Claims, 9 Drawing Sheets

(56) References Cited

U.S. PATENT DOCUMENTS

| | | |
|---|---|---|
| 2004/0067416 A1* | 4/2004 | MacLean ............ H01M 2/0275 |
| | | 429/186 |
| 2005/0069768 A1 | 3/2005 | Martinet et al. |
| 2005/0214648 A1 | 9/2005 | Boulton et al. |
| 2010/0021816 A1 | 1/2010 | Stole |
| 2014/0106190 A1 | 4/2014 | Bhardwaj et al. |
| 2014/0335391 A1 | 11/2014 | Kwon et al. |
| 2017/0237046 A1* | 8/2017 | Shindo .................... H01M 2/30 |
| | | 429/163 |

OTHER PUBLICATIONS

International Preliminary Report on Patentability dated Sep. 27, 2018 for PCT Patent Application No. PCT/US2017/016271.
Extended European Search Report dated Jan. 24, 2020 for EP Patent Application No. 17767115.3.
Search Report dated Jul. 2, 2020 for Taiwan Patent Application No. 106102397.
Notice of Allowance dated Nov. 11, 2020 for Taiwan Application No. 106102397.

\* cited by examiner

PACKAGE-LESS BATTERY CELL APPARATUS, AND METHOD FOR FORMING THE SAME

BACKGROUND

Most battery cells have a case built as a separate component before final assembly of the battery cell. The case adds volume to the cell contents and diminishes the amount of available energy per unit volume by adding to the volume of the cell. As a result, small thin cells yield a low energy density and short run-times in electronic devices.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
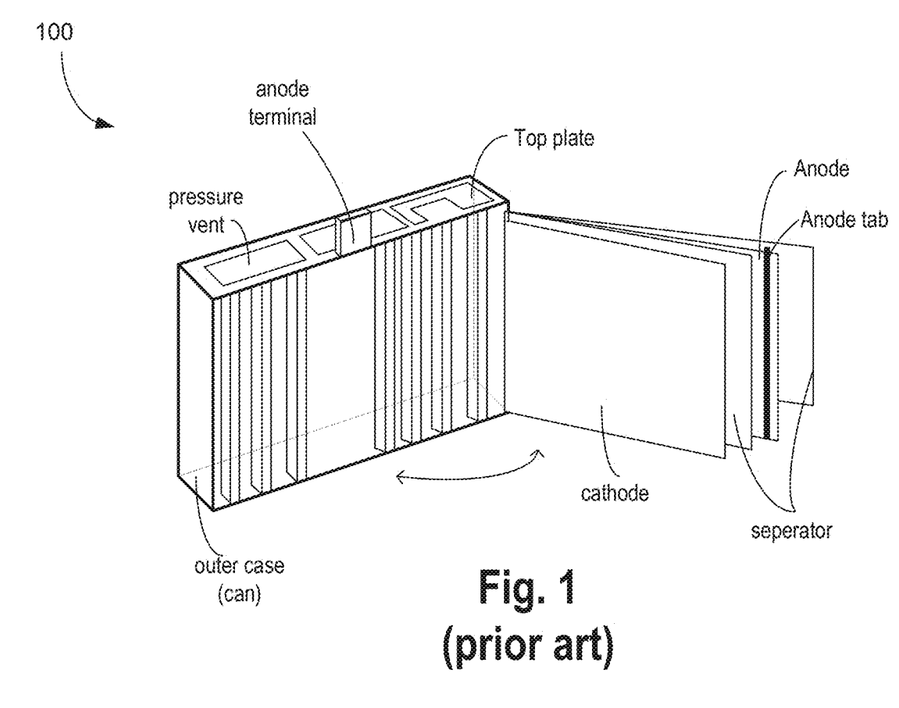
FIG. 1 illustrates a common form of Lithium-ion (Li-ion) battery with a case covering.

A common battery used in many devices (such as cell phones) is a Lithium-Ion (Li-ion) battery. A common form of Li-ion battery is a metal-cased cell type battery 100 shown in FIG. 1. As with cylindrical cells (e.g., AA, AAA cells), the metal outer casing (or can/pouch) functions as a battery terminal, also known as a current collector or an anode terminal. Such battery cases are manufactured separately from the battery active layers (e.g., cathode, separator, anode, anode tab, etc.), which are constructed and then inserted into a fixed-shaped conducting metal enclosure. The fixed-shaped metal enclosure may include a top plate and a pressure vent. The fixed-shaped metal can or pouch is then welded or crimped shut after the addition of an electrolyte. The can or pouch adds volume to battery 100 contents and diminishes the amount of available energy per unit volume by adding to the volume of battery 100. The can or pouch is generally a hermetically sealed can or pouch which is relatively bulky compared to the materials inside the can or pouch.

Some embodiments describe a package-less "naked," fundamental, or elemental battery cell. In some embodiments, no case or package for the battery cell is manufactured in a separate process. In some embodiments, terminal plates for the battery cell are directly exposed. Traditional battery cells of standardized shape and size insert into a standardized battery casing (e.g., AA, AAA, C, D, etc. battery casing). Some embodiments differ from traditional battery cells (e.g., coin or cylindrical battery cells inserted into a metal can), in that the battery contents of the various embodiments are not inserted into a pre-formed battery case. In some embodiments, the outer electrode layer from the active cell stack serves the majority of the sealing and packaging function formerly afforded by a case.

In some embodiments, the exclusion of a package allows the active elements of the battery to expand into the volume formerly occupied by the case, increasing the volume of active materials and thereby increasing the energy capacity and/or power capability of the battery cell. In some embodiments, the simplicity of sealing cells around the edges may enable battery cells to be formed or cut into random shapes which may be sealed around their edges.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, physical, or wireless connection between the things that are connected, without any intermediary devices. The term "coupled" means either a direct electrical, physical, or wireless connection between the things that are connected or an indirect electrical, physical, or wireless connection through one or more passive or active intermediary devices. The term "signal" means at least one current signal, voltage signal or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Figure 2A:
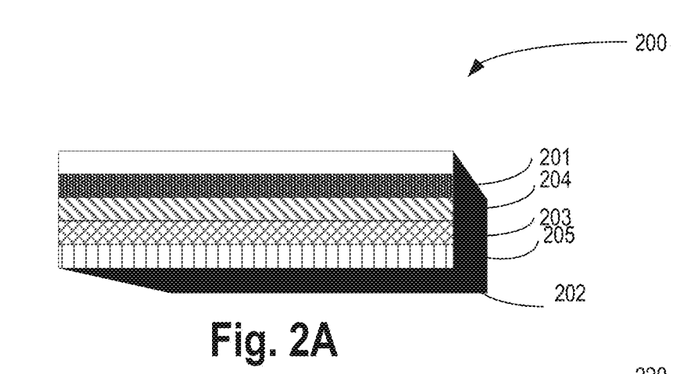
FIGS. 2A-B illustrate a fundamental battery cell with direct interface to cathode and anode current collectors, according to some embodiments of the disclosure.
Figure 2B:
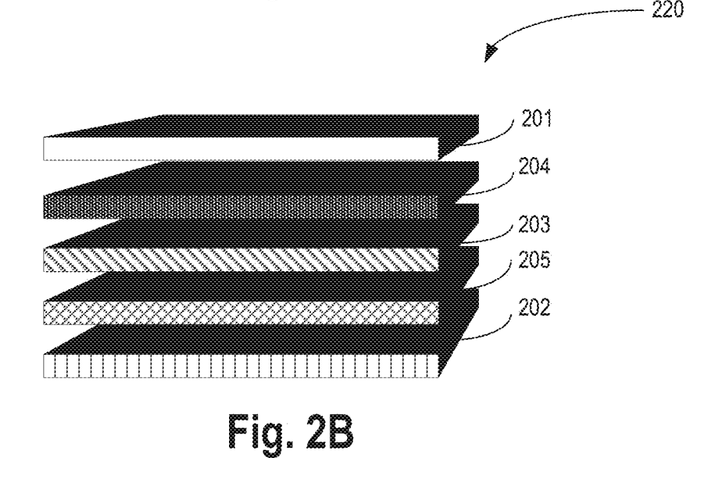

FIGS. 2A-B illustrate two views 200 and 220, respectively, of a fundamental battery cell with direct interface to cathode and anode current collectors, according to some embodiments of the disclosure. View 200 illustrates the package-less battery cell, while view 220 illustrates the individual layers of the battery cell. In some embodiments, the package-less battery cell comprises a layer of cathode current collector 201, a layer of anode current collector 202, a separator layer 203, a layer of cathode active material 204, and a layer of anode active material 205.

In some embodiments, separator layer 203 physically separates the layers of cathode active material 204 and anode active material 205 from one another. In some embodiments, separator layer 203 is adjacent to (or coupled to) layers of cathode active material 204 and anode active material 205. In some embodiments, separator layer 203 is formed of a solid polymer or ceramic which separates the cathode active material 204 from the anode active material 205. As such, separator layer 203 prevents electrical shorting of cathode active material 204 and anode active material 205, and allows for the transport of ionic charge carriers during the passage of current in the battery cell (e.g., battery cell shown in view 200).

In some embodiments, the layer of cathode active material 204 is directly coupled (or is directly adjacent) to the layer of cathode current collector 201. In some embodiments, the layer of anode active material 205 is directly coupled (or is directly adjacent) to the layer of anode current collector 202. In some embodiments, the layers of cathode current collector 201 and anode current collector 202 are exposed (e.g., no package or can contains the battery cell) and are in direct contact with cathode and anode terminals of a client system (e.g., a phone). As such, the battery cell of various embodiments provides space savings, lower assembly costs, and size reduction (e.g., in the x-y plane), and/or height reduction (e.g., in the z-plane, where the z-plane is perpendicular to the x-y plane). In some embodiments, the layers of cathode current collector 201 and anode current collector 202 are formed of conductive metals (e.g., Copper, Silver, Aluminum, etc.).

In some embodiments, the layers of cathode active material 204 and anode active material 205 are formed with incorporation of solid electrolytes such as solid polymers or ceramics. In some embodiments, the layer of cathode active material 204 may comprises, for example, lithium metal oxide (e.g., lithium cobalt oxide) or nickel cobalt aluminum. In some embodiments, the layer of anode active material 205 may comprise, for example, graphite, silicon, or a blend of graphite and silicon. Unlike batteries with liquid electrolytes, the solid electrolytes may withstand the high temperatures and durations of reflow solder processes. In some embodiments, the cathode active material 204 and anode active material 205 are rechargeable.

While the various embodiments described here illustrate a rectangular battery cell, the embodiments are not limited to such. The package-less elemental battery cell of various embodiments can be of any desirable shape to meet electrical storage capacity prerequisites, space needs, and/or esthetic desires.

Figure 3A:
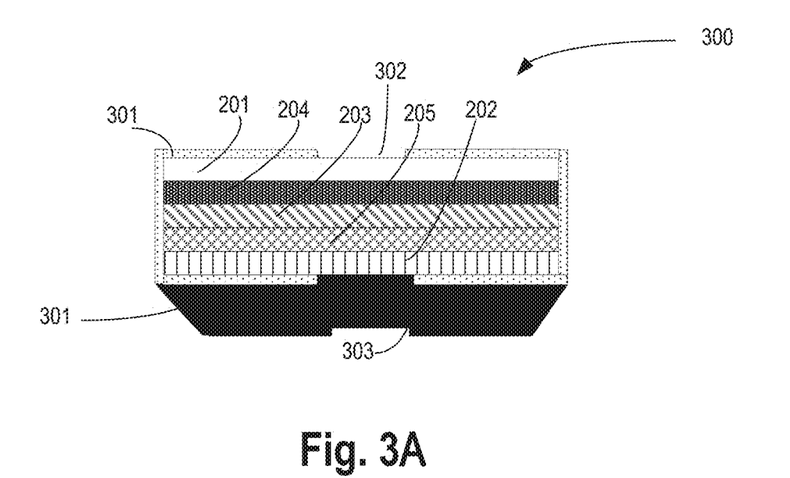
FIGS. 3A-B illustrate a fundamental battery cell with protective covering and direct access to cathode and anode current collectors, according to some embodiments of the disclosure.
Figure 3B:
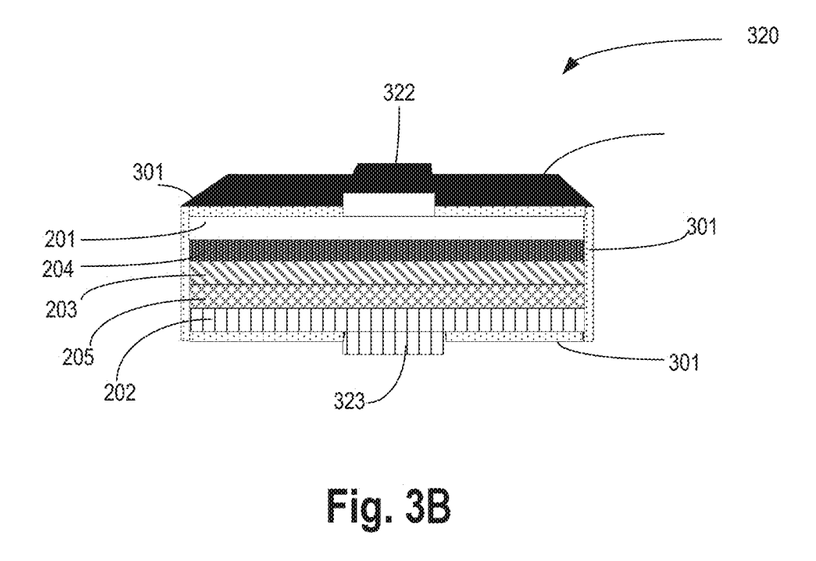

FIGS. 3A-B illustrate fundamental battery cells 300 and 320, respectively, with protective covering and direct access to cathode and anode current collectors, according to some embodiments of the disclosure. It is pointed out that those elements of FIGS. 3A-B having the same reference numbers (or names) as the elements of any other figure can operate or function in any manner similar to that described, but are not limited to such. So as not to obscure the embodiments of FIG. 3A, differences between FIG. 3A and FIG. 2A are described.

In some embodiments, a portion of section 302 of the layer of cathode current collector 201 is exposed while the rest is covered by an insulating or protective covering 301. In some embodiments, protective covering 301 wraps around battery cell 300 except for portions 302 and 303, where portion 303 exposes the layer of anode current collector 202. One function of protective covering 301 is to protect the edges from ingression of moisture, oxygen, or other elements that can cause cell degradation. By exposing regions 302 and 303, direct connectivity to cathode and anode current collectors 201 and 301, respectively, is provided. In some embodiments, the thickness of protective covering 301 is thinner compared to the thicknesses of layers 201, 202, 203, 204, and 205.

So as not to obscure the embodiments of FIG. 3B, differences between FIG. 3B and FIG. 3A are described. In some embodiments, instead of opening regions 302 and 303, direct connectivity to cathode and anode collectors 201 and 301 is provided by conducting stubs 322 and 323, respectively. Conducting stubs 322 and 323 are directly connected to cathode and anode collectors 201 and 301, respectively, according to some embodiments. In some embodiments, stubs 322 and 323 are directly connectable to client cathode and anode terminals, respectively.

Figure 4:
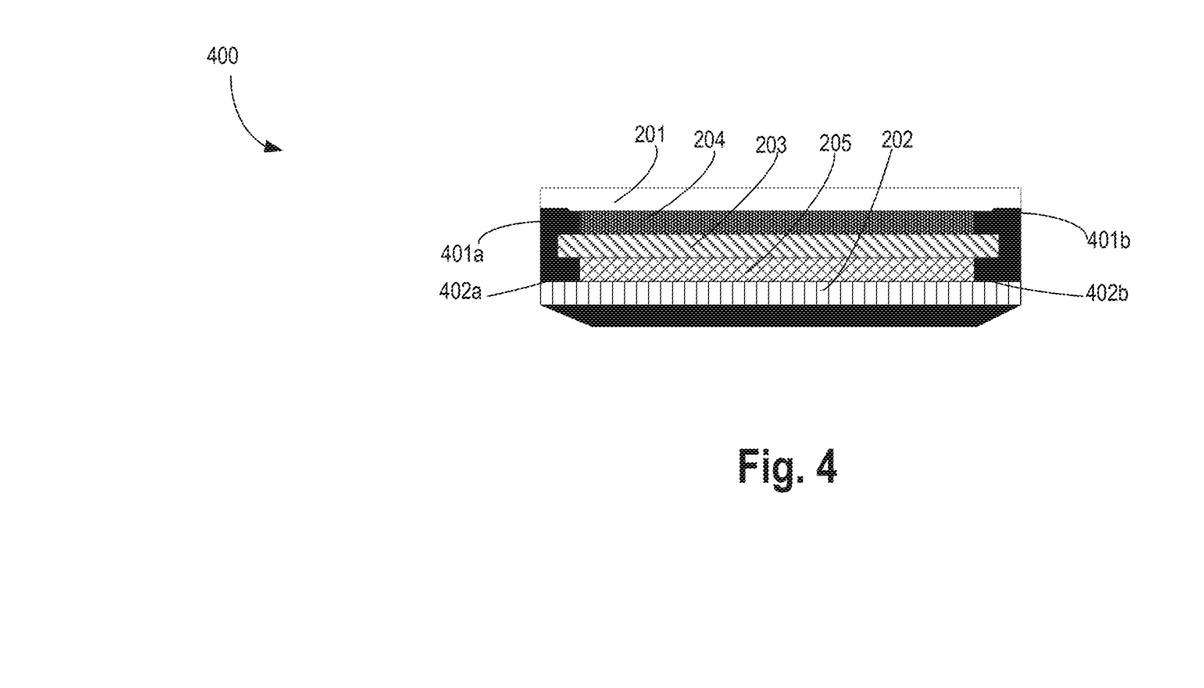
FIG. 4 illustrates package-less battery cell with sealing compound on the sidewalls, according to one embodiment of the disclosure.

FIG. 4 illustrates package-less battery cell 400 with sealing compound on the sidewalls, according to one embodiment of the disclosure. It is pointed out that those elements of FIG. 4 having the same reference numbers (or names) as the elements of any other figure can operate or function in any manner similar to that described, but are not limited to such.

In some embodiments, the layers of cathode current collector 201 and anode current collector 202 are extended in the x-y plane and a sealing compound 401a/b is applied between the end regions separating the layers of cathode current collector 201 and anode current collector 202. As such, the edges of battery cell 400 are sealed. In some embodiments, separator layer 203 is also extended along the x-y direction to make sure that the active material layers 204 and 205 are not electrically shorted. In some embodiments, pockets or regions 402a/b between the sealing compound 401a/b are filled with air. For example, a battery using oxygen as a part of the redox process might use air channels. In some embodiments, the sealing compound is polypropylene. In other embodiments, other type of compounds may be used. In some embodiments, the features described with reference to FIGS. 3A-B can also be implemented for battery cell 400.

Figure 5A:
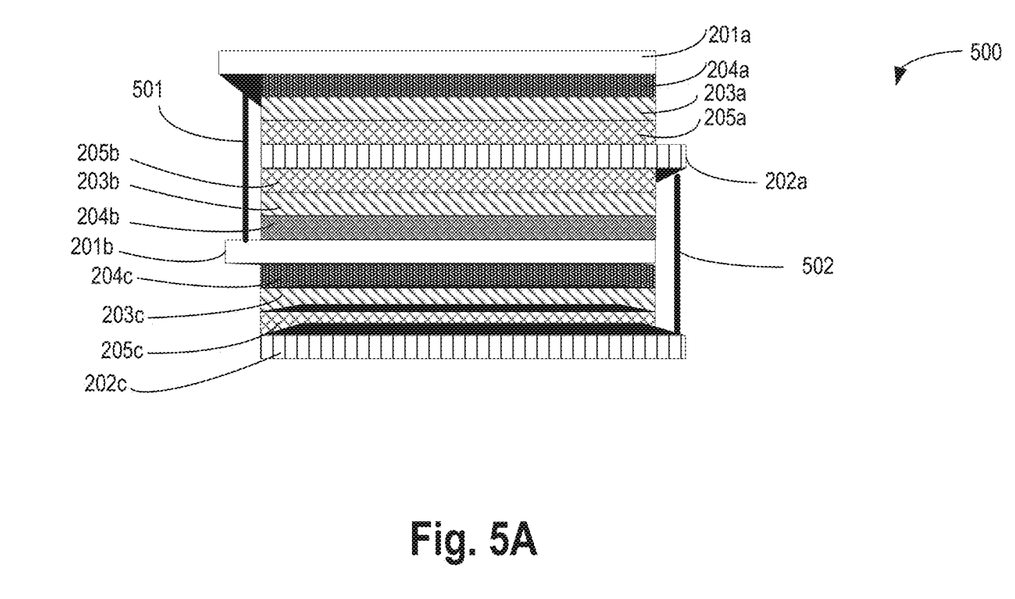
FIG. 5A illustrates a fundamental battery cell with sandwiched cathode and anode current collectors and direct access to outside cathode and anode current collectors, according to some embodiments of the disclosure.

FIG. 5A illustrates fundamental battery cell 500 with sandwiched cathode and anode current collectors and direct access to outside cathode and anode current collectors, according to some embodiments of the disclosure. It is pointed out that those elements of FIG. 5A having the same reference numbers (or names) as the elements of any other figure can operate or function in any manner similar to that described, but are not limited to such.

While the various embodiments of FIGS. 2-4 illustrate package-less battery with a single set of layers (e.g., one "sandwich"), some embodiments may use multiple such sandwiches. In some embodiments, the sandwiches are connected in parallel though the connections on the side of the battery cell. Here, a sandwich is defined by layers 201, 204, 203, 205, and 202. In the example of FIG. 5A, three sandwiches are shown. The first sandwich comprises layers 201a, 204a, 203a, 205a, and 202a, while the second sandwich comprises layers 201b, 204b, 203b, 205b, and 202a. Here, anode current collector 202a is shared with two sub-cells. Continuing with this example, the third sandwich comprises 201b, 204c, 203c, 205c, and 202c.

In some embodiments, the cathode current collectors 201a and 201b are electrically coupled to one another by conductor 501. In some embodiments, the anode current collectors 202a and 202c are electrically coupled to one another by conductor 502. As such, the top and bottom electrodes (e.g., 201a and 202c) form the cathode and anode current collectors, respectively. The embodiments, however, are not limited to three sandwiches. In some embodiments, more than three sandwiches can be formed within a battery cell to increase its power supplying capabilities.

In some embodiments, the sandwiches can be coupled together forming a tall stack with the anode connections running down one side and the cathode connections down the other. In one such embodiments, the anode/cathode connection points are on the left and the right of the battery cell, rather than top and bottom as shown. The embodiment of FIG. 5A can also integrate the features of FIGS. 3A-B and FIG. 4, in accordance with some embodiments.

Figure 5B:
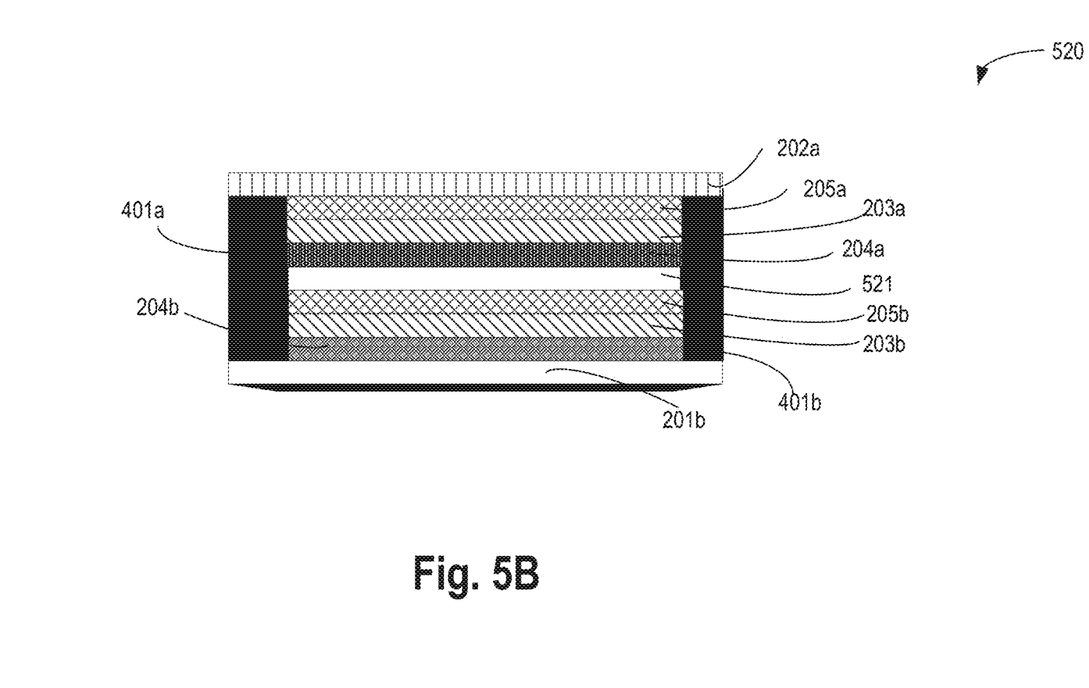
FIG. 5B illustrates a fundamental bi-polar battery cell, according to some embodiments of the disclosure.

FIG. 5B illustrates a fundamental bipolar battery cell 520, according to some embodiments of the disclosure. It is pointed out that those elements of FIG. 5B having the same reference numbers (or names) as the elements of any other figure can operate or function in any manner similar to that described, but are not limited to such.

Compared to battery cell 500, in some embodiments, bipolar stack 520 is constructed where the anode of one sandwich connects to the cathode of the next sandwich to provide a multiplicity of the voltage provided by a single stack. In this case the sandwich connection may be a current collector with anode material on one side and cathode material on the other. A person skilled in the art would appreciate that the safety associated with solid electrolytes may also minimize or even negate the need for balancing the charge states of each "sandwich" in a bipolar cell stack. In some embodiments, bipolar cell 520 is formed with an internal current collector which is pasted with an anode material on one side and cathode material on the other.

In some embodiments, anode current collector 202a is coupled to anode active material 205a. In some embodiments, anode current collector 202a forms the outer anode terminal which is to-be directly coupled to a device which is to-be charged. In some embodiments, the layer of anode active material 205a is coupled to separator layer 203a. In some embodiments, separator layer 203a is coupled to cathode active layer 204a. In some embodiments, cathode active layer 204a is coupled to an internal current collector 521. In some embodiments, the layer of internal current collector 201a is coupled to another layer of anode active material 205b. In some embodiments, the layer of anode active material 205b is coupled to another separator layer 205b. In some embodiments, separator layer 205b is coupled to another layer of cathode active material 204b. In some embodiments, cathode active material 204b is coupled to an outer cathode current collector 201b.

Figure 6A:
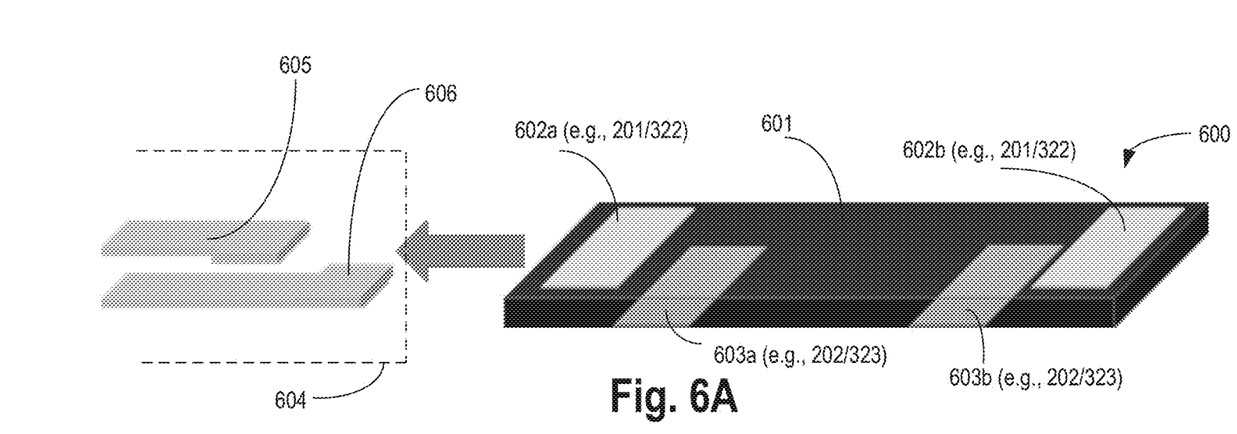
FIGS. 6A-B illustrate a fundamental battery cell with predetermined access direction to avoid terminal shorts, according to some embodiments of the disclosure.
Figure 6B:
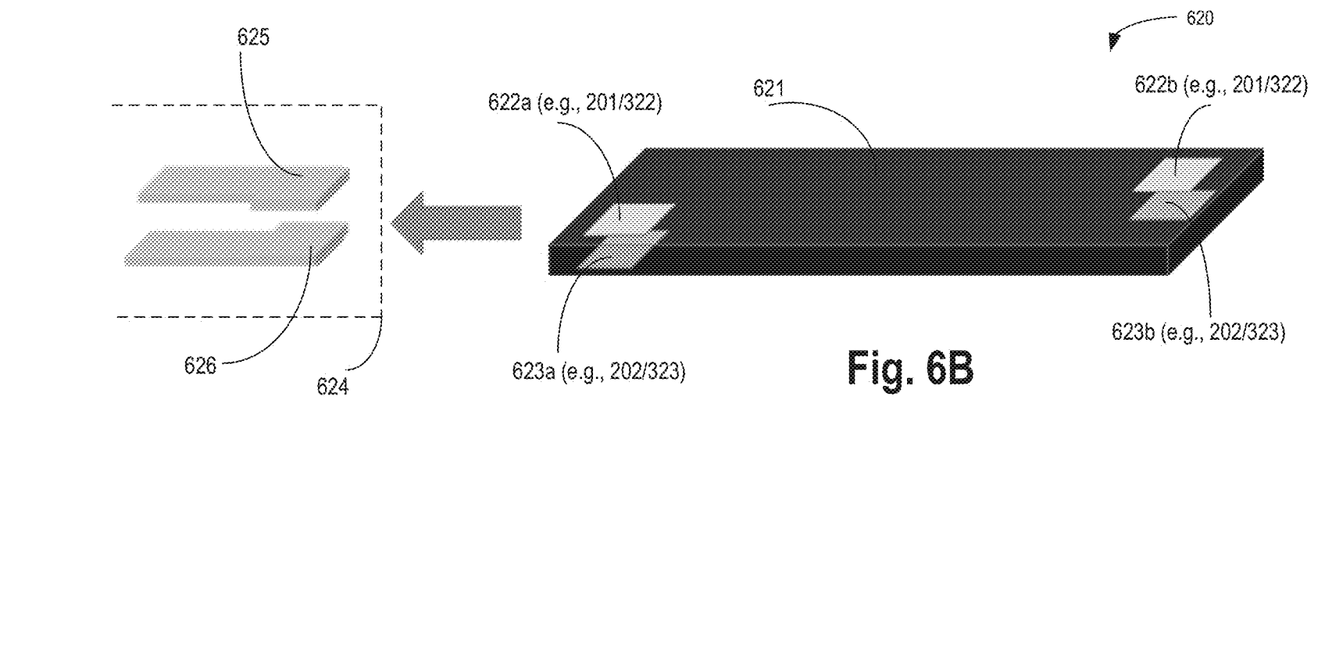

While the embodiment of FIG. 5B illustrates two sets of layers to form bi-polar battery cell 520. For example, the first set of layers are 205a, 203a, and 204a, while the second set of layers are 205b, 203b, and 204b. In some embodiments, the first set of layers is separated from the second set of layers by a current collector. In some embodiments, more than two sets of layers repeated in the same fashion. In some embodiments, sealing compound 401a/b is applied between the end regions separating the layers of cathode current collector 201b and anode current collector 202a. As such, the edges of battery cell 520 are sealed. The embodiment of FIG. 5B can also integrate the features of FIGS. 3A-B and FIG. 4, in accordance with some embodiments FIGS. 6A-B illustrate systems 600 and 620 with fundamental battery cells 601 and 621, respectively, with predetermined access direction to avoid terminal shorts, according to some embodiments of the disclosure. It is pointed out that those elements of FIGS. 6A-B having the same reference numbers (or names) as the elements of any other figure can operate or function in any manner similar to that described, but are not limited to such.

In some embodiments, the connection areas (e.g., conductive regions to be coupled to client anode and cathode terminals) are placed on battery cells 601 and 621 such that incorrect insertion of the battery cells into a client housing (e.g., 604 and 624) cannot materially harm the client or host device through incorrect terminal polarity, where the client housing is electrically and/or physically coupled to the client or host device. In some embodiments, the anode and cathode current collector access points are strategically placed or located in predetermined locations.

With reference to system 600 of FIG. 6A, two access regions 602a and 602b (e.g., 201/322) for the cathode current collector are exposed for direct connection of battery 601 to client cathode terminal 605. In some embodiments, client cathode terminal 605 is designed so that it merely couples to the exposed access regions 602a and 602b (e.g., 201/322) for the cathode current collector. In some embodiments, two access regions 603a and 603b (e.g., 202/323) for the anode current collector of battery cell 601 are exposed for direct connection to client anode terminal 606. Here, client cathode terminal 605 and client anode terminal 606 are placed in housing 604 (e.g., an input slot area of a phone). While the embodiment of FIG. 6A illustrates two cathode current collector regions and two anode collector regions, fewer or more regions may be exposed to ensure that battery cell 601 can properly connect with client cathode and anode terminals in a predetermined fashion.

FIG. 6B illustrates another example of exposing cathode and anode collector regions and corresponding client cathode and anode terminals. In this example, two access regions 622a and 622b (e.g., 201/322) for the cathode current collector are exposed for direct connection to client cathode terminal 625. In some embodiments, client cathode terminal 625 is designed so that it merely couples to the exposed access regions 622a and 622b for the cathode current collector. In some embodiments, two access regions 623a and 623b (e.g., 202/323) for the anode current collector are exposed for direct connection to client anode terminal 626. Here, client cathode terminal 625 and client anode terminal 626 are placed in housing 624 (e.g., an input slot area of a phone). While the embodiment of FIG. 6B illustrates two cathode current collector regions and two anode collector regions, fewer or more regions may be exposed to ensure that battery cell 621 can be properly connect with client cathode and anode terminals in a predetermined fashion.

In some embodiments, the package-less battery is used as replaceable batteries inserted into slots analogous to those used by SD (secure digital) memory cards. Like an SD card, the package-less battery may be keyed for correct insertion using mechanical means such as a notch, in accordance with some embodiments.

Figure 7:
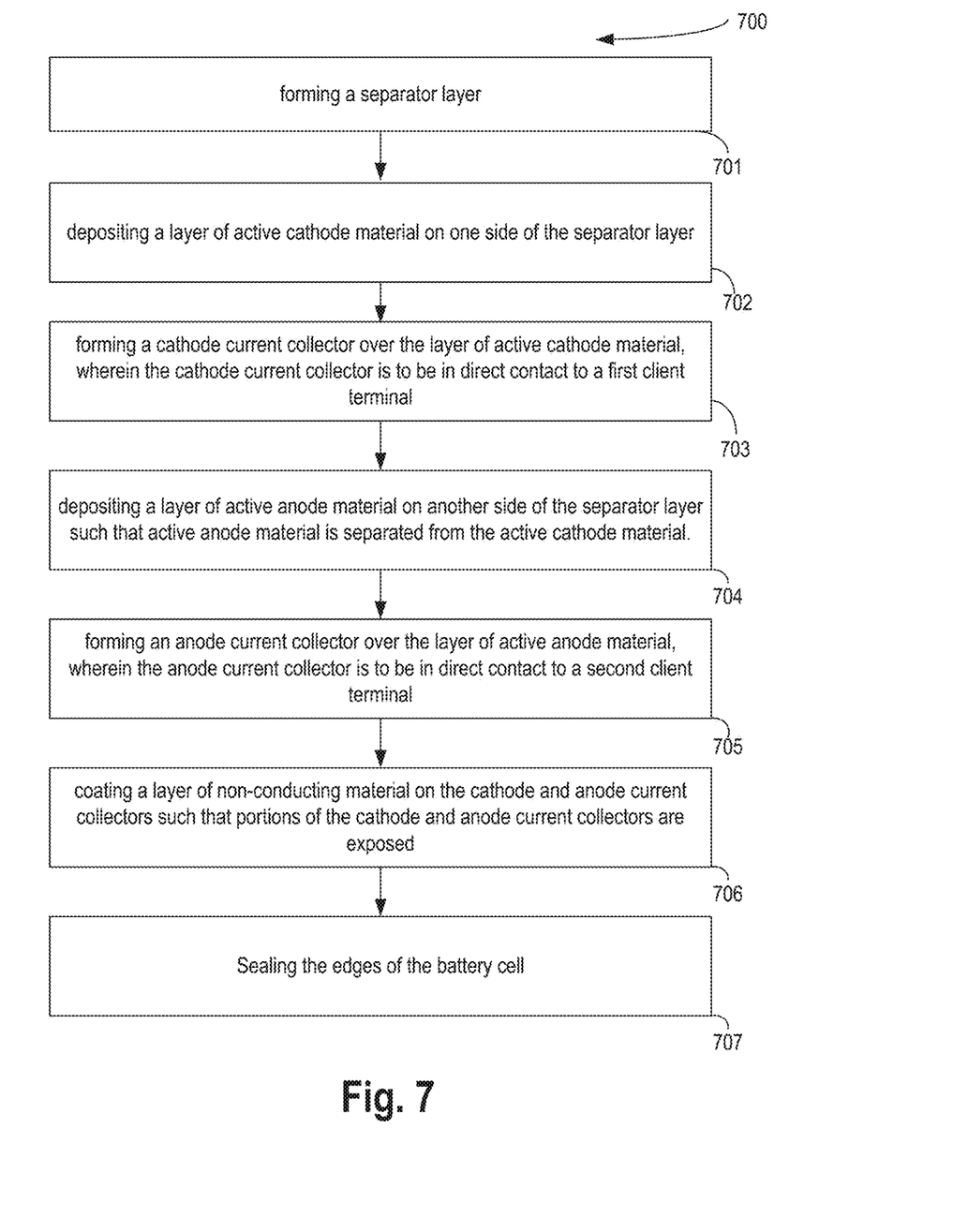
FIG. 7 illustrates a flowchart of a process of forming a fundamental battery cell, according to some embodiments of the disclosure.

FIG. 7 illustrates flowchart 700 of a process of forming a fundamental battery cell, according to some embodiments of the disclosure. It is pointed out that those elements of FIG. 7 having the same reference numbers (or names) as the elements of any other figure can operate or function in any manner similar to that described, but are not limited to such.

Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 701, a separator layer 203 (e.g., solid polymer or ceramic) is formed. The various layers to form the package-less battery may be applied from a roll of material, printed, sprayed, or otherwise deposited. The height, width, and/or length of the package-less battery can be adjusted at design time to fit in a client system. At block 702, a layer of cathode active material 204 is deposited on one side of the separator layer. In some embodiments, the layer of cathode active material 204 is one of lithium metal oxide (e.g., lithium cobalt oxide) or nickel cobalt aluminum. Any known method of depositing these materials may be used.

At block 703, a cathode current collector 201 (e.g., Cu, Ag, Al) is formed over the layer of cathode active material 204, where the cathode current collector is to be in direct contact to a first client terminal (e.g., 605). At block 704, a layer of anode active material 205 (e.g., graphite, silicon, or a blend of graphite and silicon) is deposited on another side of separator layer 203 such that anode active material 205 is separated from the cathode active material 204. Any known method of depositing these materials may be used.

In some embodiments, solid electrolytes are used for the layers of cathode active material 204 and anode active material 205. In some embodiments, the cathode active material 204 and anode active material 205 are rechargeable. At block 705, anode current collector 202 (e.g., Cu, Ag, Al, etc.) is formed over the layer of the anode active material 205, where the anode current collector 202 is to be in direct contact to a second client terminal (e.g., 606). At block 706, a layer of non-conducting material 301 (e.g., polypropylene) is coated on the cathode and anode current collectors (201 and 202, respectively) such that portions 302 and 303 of the cathode and anode current collectors are exposed. At block 707, the edges of the battery cell are sealed. For example, as described with reference to FIG. 4, in some embodiments, pockets or regions 402a/b between the sealing compound 401a/b are filled with air. For example, a battery using oxygen as a part of the redox process might use air channels. In some embodiments, the sealing compound is polypropylene. In other embodiments, other type of compounds may be used.

Figure 8:
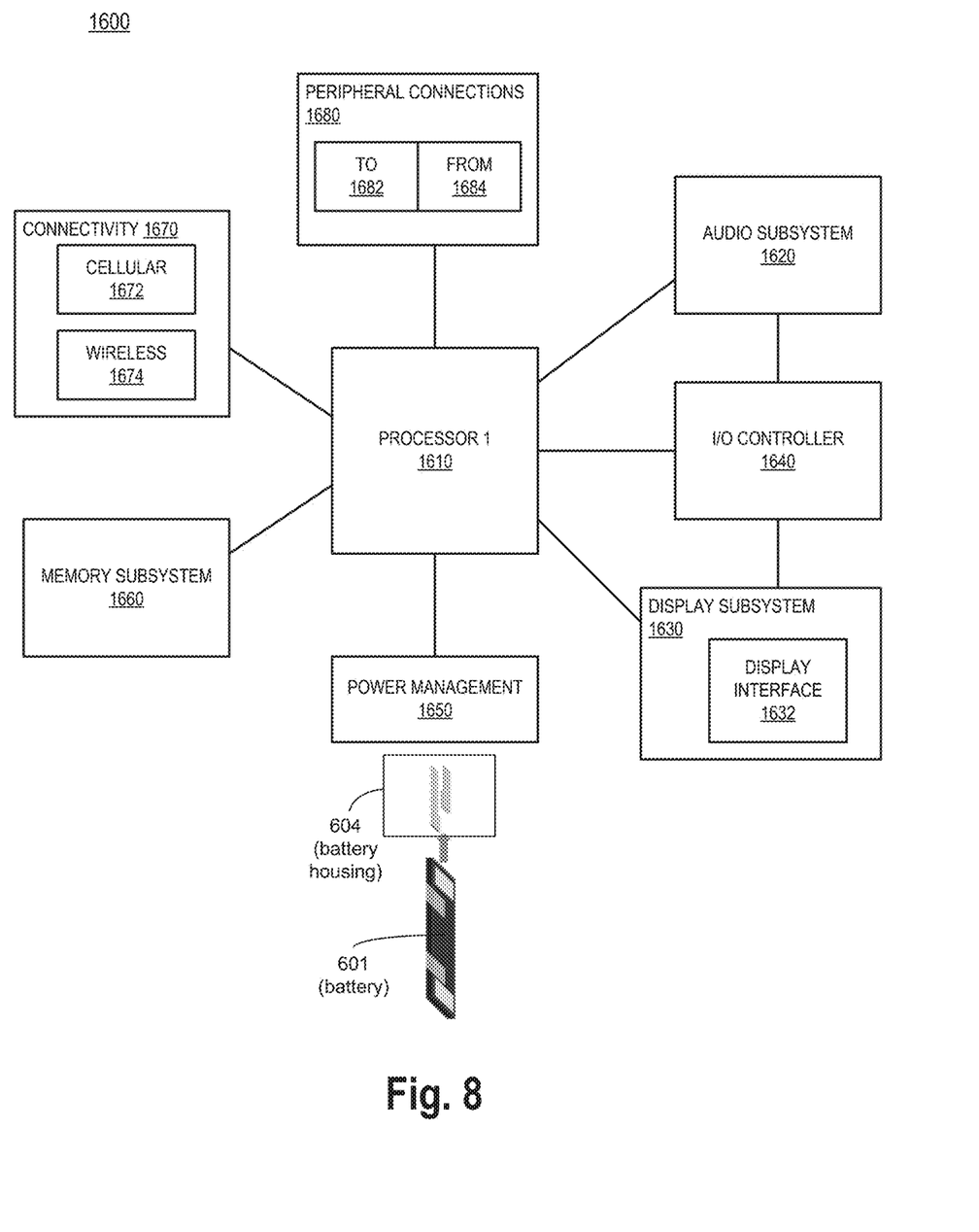
FIG. 8 illustrates a smart device or a computer system or a SoC (System-on-Chip) powered by a fundamental battery cell, according to some embodiments.

FIG. 8 illustrates a smart device or a computer system or a SoC (System-on-Chip) 1600 powered by a fundamental package-less battery cell (e.g., 601), according to some embodiments. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 powered by package-less battery cell 601, according to some embodiments discussed. Other blocks of the computing device 1600 may also be powered by the package-less battery cell 601, according to some embodiments. In some embodiments, a battery housing 604 is provided which receives battery 601 in a predetermined direction. The various embodiments of the present disclosure may also comprise a network interface within 1670 such as a wireless interface so that a system embodiment may be incorporated into a wireless device, for example, cell phone or personal digital assistant.

In some embodiments, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600. In some embodiments, power management 1650 includes apparatus and/or machine-readable medium with instructions for managing power of the randomly shaped battery.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 includes connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 includes Peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a cathode current collector configured to be in direct contact to a first client terminal; an anode current collector configured to be in direct contact to a second client terminal; and at least two layers of active material, where one layer is adjacent to the cathode current collector and another layer is adjacent to the anode current collector. In some embodiments, the apparatus comprises a layer of non-conducting material coated on the cathode current collector such that a portion of the cathode current collector is exposed.

In some embodiments, the layer of non-conducting material is coated on the anode current collector such that a portion of the anode current collector is exposed. In some embodiments, locations of the exposed cathode collector and anode collector are positioned such that the cathode and anode collectors are to be adjacent to the first and second client terminals in a predetermined configuration. In some embodiments, the at least two layers of active materials are cathode active material and anode active material. In some embodiments, the cathode active material is adjacent to the cathode current collector, and wherein the anode active material is adjacent to the anode current collector. In some embodiments, the apparatus comprises a separator layer adjacent to the at least two layers such that the anode active material is separated from the cathode active material. In some embodiments, the at least two layers of active materials are dry materials.

In another example, a method is provided which comprises: forming a separator layer; depositing a layer of active cathode material on one side of the separator layer; and forming a cathode current collector over the layer of active cathode material, wherein the cathode current collector is to be in direct contact to a first client terminal. In some embodiments, the method comprises depositing a layer of active anode material on another side of the separator layer such that active anode material is separated from the active cathode material.

In some embodiments, the method comprises forming an anode current collector over the layer of active anode material, wherein the anode current collector is to be in direct contact to a second client terminal. In some embodiments, comprises: coating a layer of non-conducting material on the cathode current collector such that a portion of the cathode current collector is exposed; and exposing a portion of the cathode current collector from the coated layer. In some embodiments, the method comprises: coating the layer of non-conducting material on the anode current collector such that a portion of the anode current collector is exposed; and exposing a portion of the anode current collector from the coated layer. In some embodiments, locations of the exposed cathode collector and anode collector are positioned such that the cathode and anode collectors are to be adjacent to the first and second client terminals in a predetermined configuration.

In another example, a system is provided which comprises: a memory; a processor coupled to the memory; and a battery to provide power to the memory and the processor; a housing for receiving the battery, the housing having a first terminal and a second terminal, wherein the battery comprises: a cathode current collector configured to be in direct contact to a first terminal; an anode current collector configured to be in direct contact to a second terminal; and at least two layers of active material, where one layer is adjacent to the cathode current collector and another layer is adjacent to the anode current collector.

In some embodiments, the battery comprises a layer of non-conducting material coated on the cathode current collector such that a portion of the cathode current collector is exposed, wherein the layer of non-conducting material is coated on the anode current collector such that a portion of the anode current collector is exposed. In some embodiments, locations of the exposed cathode collector and anode collector are positioned such that the cathode and anode collectors are adjacent to the first and second terminals in a predetermined configuration.

In some embodiments, the at least two layers of active materials are cathode active material and anode active material, wherein the cathode active material is adjacent to the cathode current collector, and wherein the anode active material is adjacent to the anode current collector. In some embodiments, the battery comprises a separator layer adjacent to the at least two layers such that the anode active material is separated from the cathode active material. In some embodiments, the at least two layers of active materials are dry materials. In some embodiments, edges of the battery are sealed by a sealant.

In another example, an apparatus is provided which comprises: means for collecting cathode current configured to be in direct contact to a first client terminal; means for collecting anode current collector configured to be in direct contact to a second client terminal; and at least two layers of active material, where one layer is adjacent to the means for collecting cathode current and another layer is adjacent to the means for collecting anode current. In some embodiments, the apparatus comprises non-conducting means coated on the means for collecting cathode current such that a portion of the means for collecting cathode current is exposed. In some embodiments, the layer of non-conducting means is coated on the means for collecting anode current such that a portion of the means for collecting anode current is exposed.

In some embodiments, locations of the exposed means for collecting cathode current and anode current are positioned such that the means for collecting cathode and anode currents are to be adjacent to the first and second client terminals in a predetermined configuration. In some embodiments, the at least two layers of active materials are cathode active material and anode active material. In some embodiments, the cathode active material is adjacent to the means for collecting cathode current, and wherein the anode active material is adjacent to the means for collecting anode current. In some embodiments, the apparatus comprises a means for separating the at least two layers such that the anode active material is separated from the cathode active material. In some embodiments, the at least two layers of active materials are dry materials.

In another example, a system is provided which comprises: a memory; a processor coupled to the memory; a battery to provide power to the memory and the processor; and a housing for receiving the battery, the housing having a first terminal and a second terminal, wherein the battery comprises: means for collecting cathode current configured to be in direct contact to the first client terminal; means for collecting anode current collector configured to be in direct contact to the second client terminal; and at least two layers of active material, where one layer is adjacent to the means for collecting cathode current and another layer is adjacent to the means for collecting anode current. In some embodiments, the battery comprises non-conducting means coated on the means for collecting cathode current such that a portion of the means for collecting cathode current is exposed.

In some embodiments, the layer of non-conducting means is coated on the means for collecting anode current such that a portion of the means for collecting anode current is exposed. In some embodiments, locations of the exposed means for collecting cathode current and anode current are positioned such that the means for collecting cathode and anode currents are to be adjacent to the first and second client terminals in a predetermined configuration. In some embodiments, the at least two layers of active materials are cathode active material and anode active material.

In some embodiments, the cathode active material is adjacent to the means for collecting cathode current, and wherein the anode active material is adjacent to the means for collecting anode current. In some embodiments, the apparatus comprises a means for separating the at least two layers such that the anode active material is separated from the cathode active material. In some embodiments, the at least two layers of active materials are dry materials.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A package-less battery cell which is configured to be independent of a housing surrounding it or directly attached to the package-less battery cell, wherein the package-less battery cell comprising:
   a cathode current collector configured to be in direct contact to a first client terminal;
   an anode current collector configured to be in direct contact to a second client terminal;
   at least two layers of active material, where one layer is adjacent to the cathode current collector and another layer is adjacent to the anode current collector; and
   a layer of non-conductive material coated on the cathode current collector such that a portion of the cathode current collector is exposed to be in direct contact to the first client terminal, wherein the exposed portion of the cathode current collector is in a trench adjacent to the non-conductive material, wherein the non-conductive material includes polypropylene, wherein the portion of the cathode current collector exposed is configured as a stub, wherein the stub is substantially in a middle of the package-less battery cell, and wherein the cathode current collector, the anode current collector, and the at least two layers of active material are expandable when in use.

2. The package-less battery cell of claim 1; wherein the layer of non-conducting material is coated on the anode current collector such that a portion of the anode current collector is exposed.

3. The package-less battery cell of claim 2, wherein locations of the exposed cathode current collector and anode collector are positioned such that the cathode and anode current collectors are to be adjacent to the first and second client terminals in a predetermined configuration.

4. The package-less battery cell of claim 1, wherein the at least two layers of active materials are cathode active material and anode active material.

5. The package-less battery cell of claim 4, wherein the cathode active material is adjacent to the cathode current collector, and wherein the anode active material is adjacent to the anode current collector.

6. The package-less battery cell of claim 4 comprises a separator layer adjacent to the at least two layers such that the anode active material is separated from the cathode active material.

7. The package-less battery cell of claim 1, wherein the at least two layers of active materials are dry materials.

8. A package-less battery which is configured to be independent of a housing surrounding it or directly attached to the package-less battery, wherein the package-less battery comprising:
   a cathode current collector; and
   a layer of non-conductive material coated on the cathode current collector such that a portion of the cathode current collector is exposed to be in direct contact to a client terminal, wherein the exposed portion of the cathode current collector is in a trench adjacent to the non-conductive material, wherein the non-conductive material includes polypropylene, wherein the portion of the cathode current collector exposed is configured as a stub, wherein the stub is substantially in a middle of the package-less battery, and wherein the cathode current collector is expandable when in use.

9. The package-less battery of claim 8, wherein the client terminal is a first terminal, wherein the package-less battery comprising:
   an anode current collector configured to be in direct contact to a second client terminal; and
   at least two layers of active material, where one layer is adjacent to the cathode current collector and another layer is adjacent to the anode current collector.

10. The package-less battery of claim 9, wherein the cathode current collector is configured to be in direct contact to the client terminal.

11. The package-less battery of claim 9, wherein the anode current collector and the at least two layers of active material are expandable when in use.

12. The package-less battery of claim 9, wherein the package-less battery is configured to be received in a covering that allows the package-less battery to expand within the covering when in use.

13. The package-less battery of claim 12, wherein the covering is communicatively coupled to a processor, which is coupled to a memory.

14. A package-less battery which is configured to be independent of a housing surrounding it or directly attached to the package-less battery, wherein the package-less battery comprising:
   a top region comprising:

a cathode current collector; and a layer of non-conductive material coated on the cathode current collector such that a portion of the cathode current collector is exposed to be in direct contact to a client terminal, wherein the exposed portion of the cathode current collector is in a trench adjacent to the non-conductive material, wherein the non-conductive material includes polypropylene, wherein the portion of the cathode current collector exposed is configured as a first stub from the trench, wherein the stub is substantially in a middle of the top region, and wherein the cathode current collector is expandable when in use; and a bottom region opposite the top region, wherein the bottom region comprises:

an anode current collector; and the layer of non-conductive material coated on the anode current collector such that a portion of the anode current collector is exposed to be in direct contact to the client terminal, wherein the exposed portion of the anode current collector is in a trench adjacent to the non-conductive material, wherein the portion of the anode current collector exposed is configured as a second stub from the trench, wherein the second stub is substantially in a middle of the bottom region, and wherein the anode current collector is expandable when in use.

15. The package-less battery of claim 14, comprises at least two layers of active materials, wherein one layer is adjacent to the cathode current collector and another layer is adjacent to the anode current collector, wherein the at least two layers are cathode active material and anode active material.

16. The package-less battery of claim 15, wherein the cathode active material is adjacent to the cathode current collector, and wherein the anode active material is adjacent to the anode current collector.

17. The package-less battery of claim 15 comprises a separator layer adjacent to the at least two layers such that the anode active material is separated from the cathode active material.

18. The package-less battery of claim 14 comprises a first edge and a second edge, wherein the first edge and the second edge are adjacent to the top region and the bottom region, wherein the first edge and the second edge are sealed by a sealant.

* * * * *